Figure 1:
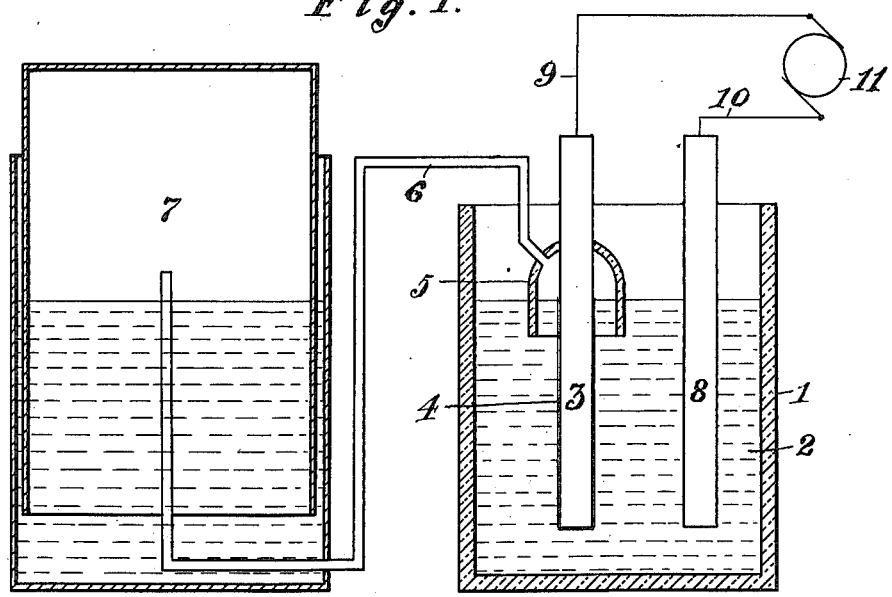

C. J. REED.
ELECTROLYTIC PROCESS.
APPLICATION FILED DEC. 26, 1911.

1,032,623.

Patented July 16, 1912.

Witnesses
R. J. Halzer
N. P. Leonard.

Inventor
Charles J. Reed
By Byrnes Townsend & Dickinson
Attorneys

UNITED STATES PATENT OFFICE.

CHARLES J. REED, OF PHILADELPHIA, PENNSYLVANIA.

ELECTROLYTIC PROCESS.

1,032,623.  Specification of Letters Patent.  Patented July 16, 1912.

Application filed December 26, 1911. Serial No. 667,607.

*To all whom it may concern:*

Be it known that I, CHARLES J. REED, a citizen of the United States, residing at Philadelphia, in the county of Philadelphia and State of Pennsylvania, have invented certain new and useful Improvements in Electrolytic Processes, of which the following is a specification.

My invention relates to an electrolytic process in which a gas, especially oxygen, is produced at one electrode, while a reversible chemical action takes place at the other electrode without the evolution of any gaseous product.

In the ordinary method of producing oxygen and hydrogen gases by the electrolysis of an aqueous solution, electrodes are used which are inert and do not enter into the electrochemical reaction, hence chemical changes occur in the electrolyte only. And it is customary to provide both electrodes with hoods or receivers for collecting the two gases, which are produced in chemically equivalent quantities. It often occurs, however, that the oxygen only is required, the hydrogen being a valueless by-product.

According to my present process I produce a gas at one electrode only, and utilize the energy expended at the other electrode in producing valuable non-gaseous products.

The following is a practical example of my process: Dilute sulfuric acid is electrolyzed with an anode of lead peroxid and a cathode of lead sulfate. Oxygen is evolved at the anode and the lead sulfate of the cathode is simultaneously reduced to metallic lead without the evolution of any gas. The reduced lead is a useful product, having a large amount of potential chemical energy, absorbed in reduction and recoverable by resulfation. By replacing the lead sulfate cathode when reduced to metallic lead, the process may be made continuous. The metallic lead produced by this electrolytic reduction of lead sulfate is usually in a spongy or minutely divided state, and is chemically very active. It may therefore be utilized as a powerful reducing agent, either in an ordinary chemical reaction, or in an electrochemical reaction. For example it may be used as a purely chemical reagent for the reduction of ferric sulfate to ferrous sulfate, a reaction which rapidly takes place on merely inserting the reduced spongy lead into a solution of ferric sulfate, and is represented by the chemical equation:

$$Fe_2(SO_4)_3 + Pb = PbSO_4 + 2FeSO_4.$$

The sulfated lead electrode may now be used again as a regenerated cathode for producing an additional quantity of oxygen in the electrochemical reaction. An electrochemical use for the spongy lead product is the electrolytic reduction in a separate receptacle of metals, such as metallic nickel, which cannot be reduced to a metallic state by the spongy lead alone but which may be reduced electrolytically, using the spongy lead as an anode, with the expenditure of a very small amount of electrical energy. To utilize the spongy lead in this manner, I remove the cathode, which has been reduced from lead sulfate to spongy lead in producing oxygen gas, to a separate receptacle containing a solution of a sulfate of a metal, such as nickel, and therein use it as an anode. The metallic nickel or other metal is deposited on any suitable cathode, such as a rod or sheet of metallic nickel. In this reaction, the electrochemical change is represented by the chemical equation:

$$NiSO_4 + Pb = PbSO_4 + Ni.$$

The spongy lead is reconverted into lead sulfate and the metallic nickel is deposited on the cathode. When the spongy lead has been sufficiently converted into lead sulfate, it may again be transferred to the original receptacle and used as a cathode in the generation of oxygen. The operation therefore becomes cyclic, and the same electrode may be used alternately an indefinite number of times, as cathode for the production of oxygen gas in the one receptacle and as anode for the electrodeposition of a metal in the second receptacle.

The apparatus by which my process may be carried out is illustrated in the accompanying drawing, in which—

Figure 2:
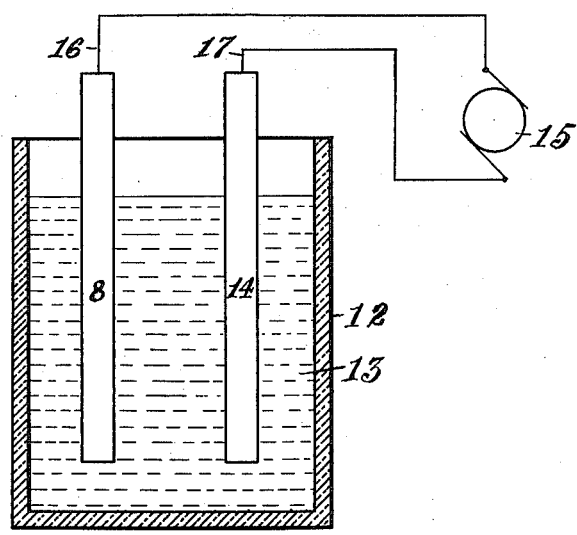

Figure 1 is a sectional view of an oxygen-gas generating cell; and Fig. 2 is a similar view of a separate receptacle for the electrodeposition of a metal.

Referring to Fig. 1: a receptacle 1 of suitable material contains an electrolyte 2 of dilute sulfuric acid, in which is an anode consisting of a sheet of metallic lead 3 having a superficial coating of lead peroxid 4 on the portion in contact with the electrolyte. A suitable bell, hood or receiver 5 carried by this anode serves for the collection of the evolved gas. The bell has an exit pipe 6, by which the gas may be transferred to any suitable holder 7. The cathode 8 consists of a grid of metallic lead holding a body of lead sulfate, or a mixture of lead sulfate and finely-divided lead. Conductors 9, 10 connect the electrodes 3 and 8 with any suitable source of electrical energy, such as a direct-current dynamo 11.

Referring to Fig. 2: a suitable receptacle 12 contains a solution 13 of a metallic sulfate, such as nickel sulfate, in which is placed the elctrode 8, reduced to spongy lead in the previous operation and now acting as anode. A cathode 14 of sheet nickel or other material is employed. The anode and cathode are connected to the source of electrical energy 15 by conductors 16, 17. In practice, I have found it desirable to wash out the electrolyte from the pores of the electrode after removing it from one receptacle and before inserting it in the other, to prevent contamination of the liquids. The reduction of lead sulfate to metallic lead in cell 1 causes a continuous addition of sulfuric acid to the electrolyte 2, and increases its concentration. It is therefore necessary to renew this electrolyte at suitable intervals, or remove a portion of it and replace it by water. The accumulating sulfuric acid may be used as a by-product. By the operation going on in the second receptacle 12, there is a withdrawal of both sulfuric acid and nickel from the nickel sulfate solution 13, which necessitates its replenishment with nickel sulfate or renewal with fresh solution from time to time.

I claim:

1. The process of electrolytically generating a gas, which consists in electrolyzing a solution, using one electrode at which the desired gas is evolved and a second electrode which undergoes chemical reaction without gas-evolution, and removing and utilizing the second electrode.

2. The process of electrolytically generating a gas, which consists in electrolyzing a solution, using one electrode at which the desired gas is evolved and a second electrode which undergoes chemical reaction without gas-evolution, and removing and utilizing the second electrode and restoring it to its original condition in a second receptacle.

3. The process of electrolytically generating a gas, which consists in electrolyzing a solution, using one electrode at which the gas is evolved and another electrode which undergoes chemical reaction without gas-evolution, and restoring the chemically-changed electrode to its original condition by a second electro-chemical reaction.

4. The process of electrolytically producing oxygen gas, which consists in electrolyzing a solution of sulfuric acid with an anode at which oxygen is evolved and a cathode containing lead sulfate, and removing the cathode of metallic lead and electrochemically converting it into lead sulfate in a separate receptacle by an electrolyte containing a metallic sulfate.

5. The process of producing oxygen gas, which consists in electrolyzing a solution of sulfuric acid, using an anode of lead having a film of lead peroxid on its surface and a cathode containing lead sulfate as chemically-active material, and removing the cathode of metallic lead to a suitable receptacle containing a nickel sulfate solution and therein electrochemically converting the metallic lead into lead sulfate.

6. The process of electrolytically generating a gas, which consists in electrolyzing a solution, using one electrode at which the desired gas is evolved and another electrode which undergoes chemical reaction without evolving a gas, removing the chemically-changed electrode, washing it free from solution, and restoring it to its original condition in a separate receptacle.

7. The process of electrolytically generating a gas, which consists in electrolyzing a solution, using one electrode at which the desired gas is evolved and another electrode which undergoes chemical reaction without evolving a gas, removing the chemically-changed electrode, washing it free from solution, and restoring it to its original condition by a second electrochemical reaction.

8. The process of electrolytically producing oxygen gas, which consists in electrolyzing a solution of sulfuric acid with an anode at which oxygen is evolved and a cathode containing lead sulfate, removing the cathode of metallic lead, washing it free from the solution, and electrochemically converting it into lead sulfate in a separate receptacle by an electrolyte containing a metallic sulfate.

9. The process which consists in passing an electric current through a solution of sulfuric acid from an inert anode to a cathode of lead sulfate, and withdrawing the resulting oxygen and reduced lead.

10. The process which consists in passing an electric current through a solution of sulfuric acid from an inert anode to a cathode of lead sulfate, withdrawing the resulting oxygen and reduced lead, and electrochemically converting the reduced lead back to lead sulfate.

11. The process which consists in passing an electric current through a solution of sulfuric acid from an anode of peroxidized lead to a cathode of lead sulfate, withdrawing the resulting oxygen and reduced lead, and electrochemically converting the reduced lead back to lead sulfate in a solution of nickel sulfate, with precipitation of the nickel.

12. The process which consists in passing an electric current through a solution of sulfuric acid from an inert anode to a cathode of lead sulfate, withdrawing the resulting oxygen and reduced lead, washing the reduced lead, and electrochemically converting the reduced lead into lead sulfate in a solution of a metallic sulfate.

In testimony whereof I affix my signature in presence of two witnesses.

CHARLES J. REED.

Witnesses:
FRANK A. LEACH,
J. M. JACKSON.